3,494,761
METHOD FOR MAKING IRON POWDER
Conrad Percival Gravenor, Edmonton, Alberta, Canada, assignor, by mesne assignments, to The Research Council of Alberta, a corporation of Canada
No Drawing. Filed May 15, 1967, Ser. No. 638,620
Int. Cl. C21b 1/08; B22f 9/00
U.S. Cl. 75—.5    3 Claims

ABSTRACT OF THE DISCLOSURE

A modification of the known method of making iron powder by reducing ferrous chloride with hot hydrogen and comminuting the iron sponge produced. Iron powder is admixed with ferrous chloride which is to be reduced. The amount of iron powder admixed is preferably between 20 and 70 percent by weight of the iron in the mixture. This size of the iron crystals which form the products of the reduction of the mixture is larger than would be the case if iron powder had not been admixed. There is concomitant alteration of the apparent density and flow characteristic of the iron powder product.

Background of the invention

This invention relates to improvements in a method for making iron powder. More particularly, it relates to a modification of the known process for reducing ferrous chloride with hot hydrogen to produce iron sponge which may be subsequently comminuted to iron powder form.

United States Patent Nos. 3,258,332 and 3,244,512 relate to methods for producing iron powder. In accordance with these disclosures, ferrous chloride powder is reacted with hot hydrogen to reduce the ferrous chloride to iron sponge form. The sponge may then be comminuted using conventional means, such as a hammer mill, to powder form. The resultant particles are comprised of agglomerates of minute crystals of iron. Generally speaking, the product has an apparent density of about 1.5 grams per cubic centimetre and, when placed in a Hall flowmeter to measure its flow characteristic in accordance with ASTM Designation B213–48, it will not flow at all.

To find commercial application in certain fields of powder metallurgy, iron powder should have an apparent density of about 2.0–3.0 grams per cubic centimetre and a Hall flowmeter rating of about 60 seconds or less. As a case in point, large quantities of iron powder are used to make pressed parts. A powder having a high apparent density is preferred for this in order to reduce the size of mold needed and the length of throw of the compacting hydraulic press. Additionally, the powder should flow freely to completely fill the crevices of the mold.

It is therefore desirable to modify the previously described reduction step for producing iron power whereby the powder product has a higher apparent density and better flow characteristic than has heretofore been the case.

Summary of the invention

The object of the present invention is to modify the process for producing iron powder by hot hydrogen reduction of ferrous chloride so as to produce a powder having a substantially higher apparent density and better flow characteristic than has heretofore been possible.

This object is achieved by admixing a quantity of iron powder, preferably recycled iron powder, preferably recycled iron powder produced by the hot hydrogen reduction of ferrous chloride, with ferrous chloride powder to provide a unique mixture for subsequent reduction and comminution. The product powder produced upon reduction and comminution of the mixture is found to have a higher apparent density and better flow characteristic than is the case where pure ferrous chloride is reduced and comminuted. The product is therefore suited to compete for markets, such as the pressed parts market, where high apparent density and good flow characteristics are important considerations.

Description of the preferred embodiment

Before describing the inventive method in detail, it will be helpful to give a possible explanation of the role which the admixed iron plays in the hot hydrogen reduction step. The process is not fully understood and it is not intended that this explanation should in any way limit the invention.

During reduction of ferrous chloride with hot hydrogen, it is believed that the ferrous chloride is vaporized. In this state, the ferrous chloride reacts with the hydrogen to produce iron and hydrogen chloride gas. Some of the iron appears to deposit in the form of "nuclei" upon which the remainder of the iron deposits to form gradually growing crystals. In accordance with the invention, iron powder particles are supplied in conjunction with the ferrous chloride during reduction. It is hypothesized that the "admixed" iron partticles act as "nuclei." As a result, at least part of the vaporized iron would deposit on the admixed iron crystals with consequential growth thereof. Additionally, it is believed that some of the smaller, admixed iron crystals react with the hydrogen chloride gas and are vaporized as ferrous chloride. Upon subsequent reduction, this iron would deposit on the larger, solid crystals of iron. It is observable that the smaller crystals of admixed iron tend to disappear during reduction and the larger crystals grow larger. In any case, the size of the crystals of the iron product recovered in accordance with the invention are larger than in the case where admixed iron particles are not provided during reduction. As a result of this crystal growth there is an increase in apparent density and an improvement in flow rate.

The source of the ferrous chloride powder is not critical to the invention. It is, of course, preferable to utilize the invention as part of a large scale, continuous or batch process for making iron powder from a raw material such as iron concentrate or scrap. Such a process is described in U.S. Patents 3,258,332 and 3,244,512. It involves leaching the raw material with hydrochloric acid solution and crystallizing ferrous chloride in hydrated form from solution. The product crystals may subsequently be partially dehydrated to a form such as Fe C12.2H20, wherein they will not melt in their own water of hydration.

The source of the iron powder, to be admixed with the ferrous chloride powder, is not critical to the success of the invention. The preferred source will be iron powder recycled from the hot hydrogen reduction and comminution steps which are discussed in greater detail hereinbelow.

Any amount of admixed iron will be beneficial in increasing the size of the crystals of the final iron product. However, it is preferable to admix an amount of iron between 20 and 70 percent of the weight of the iron in the mixture. If the quantity of admixed iron is less than about 20 percent by weight of the iron in the mixture, the improvement in apparent density and flow rate will be small and of doubtful economic interest. If the quantity is greater than about 70 percent by weight the powder tends to become too coarse and the strength of green compacts made from the powder may be deleteriously affected. Generally speaking, admixing about 30 to 50 percent by weight iron powder will normally give best results.

The size of the product iron crystals is also affected to some degree by the reduction temperature. The higher the temperature in the reactor, the greater will be the amount of hydrogen chloride vapor which can exist in the reactor at equilibrium. The result: greater iron redeposition and increased crystal growth.

Therefore the characteristics of the product powder may be varied by the amount of admixed iron and, to a lesser degree, by the conditions of reduction.

Once the amount of iron powder which is to be admixed has been determined, it is thoroughly mixed with the ferrous chloride powder which is to be reduced. One suitable method for mixing involves a paddle mixer with a residence time of 5 to 15 minutes.

It is desirable to provide the mixture in the reduction zone in a form which will permit ready access of the hot hydrogen gas to all parts of the mixture for complete reduction thereof. I have found that providing the mixture within the zone in the form of briquettes will best insure this object. Interconnected void spaces between the briquettes will provide channels through which the gas may easily flow. The mixture may be briquetted using a conventional ring roll press. Briquettes weighing less than 20 grams have been found suitable for the purposes of the invention.

The reduction of the mixture is carried out in accordnace with the prior art. The briquettes may be placed in a reactor and hot hydrogen, pre-heated to about 700–800 degrees C., flowed over it for a period of time sufficient to reduce substantially all the ferrous chloride to metal. The rate of flow is preferably controlled to maintain the partial pressure of hydrogen chloride at less than about 70 percent of the equilibrium value.

Following reduction, the iron sponge product is comminuted to powder form. A hammer mill is one known apparatus suitable for this purpose.

The iron powder produced may be recycled more than once if one erduction cycle is not enough to produce a powder having the desired apparent density. With each recycle, the apparent density of the product powder will be increased.

The invention will now be illustrated by the following examples:

Example I 1,000 grams of commercial grade, pure ferrous chloride dihydrate powder were compacted to form cylindrical briquettes, 1 inch in diameter by ½ inch in thickness, using a pressure of 1 ton per square inch. The resultant briquettes were placed in a closed stainless steel tube having a diameter of 4 inches. Hot hydrogen was admitted to the tube at an inlet temperature of 750 degrees contrigrade, and flowed at 40 standard cubic feet per hour over the briquettes for a period of one hour. After cooling to room temperature in hydrogen, the briquettes were examined and were found to have been reduced to the metallic state.

The briquettes were then commiuted by feeding them into a 5 inch diameter hammer mill rotating at 3,000 revolutions per minute. The resultant powder was tested in a Hall flowmeter in accordance with ASTM Designation B213–48 to determine its flow characteristics. Additionally, the apparent density and screen fractions were determined. The data collected is as follows:

TABLE I.—POWDER NO. 121

| Flow rate (secs./50 g.) | Apparent density (g./cc.) | Screen analysis | | | | | | |
|---|---|---|---|---|---|---|---|---|
| Nil | 1.52 | Screen opening, mm | 0.149 | 0.105 | 0.074 | 0.063 | 0.044 | −0.044 |
|  |  | Wt. percent retained | 6.2 | 7.5 | 10.1 | 4.9 | 18.3 | 52.3 |

Example II 752 grams of commercial grade, pure ferrous chloride dihydrate powder were thoroughly blended with 248 grams of iron powder (#121) obtained from the hot hydrogen reduction of ferrous chloride. Blending was carried out in a tumbler for a period of 15 minutes. The mixture was compacted to form cylindircal briquettes 1 inch in diameter by ½ inch in thickness using a pressure of 1 ton per square inch. The resultant briquettes were placed in a closed stainless steel tube having a diameter of 4 inches. Hot hydrogen was admitted to the tube at an inlet temperature of 750 degrees centrigrade and flowed at 40 standard cubic feet per hour over the briquettes for a period of one hour. After cooling to room temperature in hydrogen, the briquettes were examined and were found to have been reduced to the metallic state.

The briquettes were then comminuted by feeding them into a 5 inch diameter hammer mill rotating at 3,000 revolutions per minute. The characteristics of the powder were determined as in Example I.

TABLE II.—POWDER 121-C-1

| Flow rate (secs./50 g.) | Apparent density (g./cc.) | Screen analysis | | | | | | |
|---|---|---|---|---|---|---|---|---|
| 52 | 1.95 | Screen opening, mm | 0.149 | 0.105 | 0.074 | 0.063 | 0.044 | −0.044 |
|  |  | Wt. percent retained | 32.1 | 18.0 | 13.1 | 5.4 | 11.1 | 19.8 |

Example III

The iron powder produced in Example II was recycled, in accordance with the procedure of Example II, an additional three times. Table III gives the results of the fourth cycle:

TABLE III.—POWDER 121-C-4

| Flow rate (secs./50 g.) | Apparent density (g./cc.) | Screen analysis | | | | | | |
|---|---|---|---|---|---|---|---|---|
| 37 | 2.49 | Screen opening, mm | 0.149 | 0.105 | 0.074 | 0.063 | 0.044 | −0.044 |
|  |  | Wt. percent retained | 38.8 | 12.2 | 10.2 | 4.5 | 24.4 | 9.6 |

From the above results, it is evident that there is a marked increase in apparent density and particle size when iron powder is admixed with ferrous chloride and the mixture is reduced with hydrogen. Additionally, the flow characteristics of the powder is improved. These changes in powder characteristics are enhanced if the procedure is repeated a number of times.

Experiments were carried out using ferrous chloride-metallic iron mixtures in which 10 to 75 percent of the iron in the mixture was in the form of metallic iron. In all cases an increase in particle size and apparent density was noted.

When pure ferrous chloride briquettes were reduced it was noted that the reduced briquettes deformed during reduction and had low strength. After iron was introduced into the ferrous chloride, the mixture was made into briquettes and the briquettes reduced in hydrogen; it was noticed that there was little or not deformation during reduction and the reduced briquettes had better strength.

What I claim as my invention is:
1. In the method for producing iron powder by the briquetting, hot hydrogen reduction and comminution of ferrous chloride powder;

The improvement which results in an increase in the apparent density and an improvement in the flow characteristic of the product powder, which improvement comprises:

admixing iron powder with the ferrous chloride powder to provide a mixture for the briquetting, reduction and comminution steps.

2. The method as defined in claim 1 wherein the admixed iron comprises between 20 and 70 percent by weight of the iron in the mixture.

3. In the method for producing iron powder by the briquetting, hot hydrogen reduction and comminution of ferrous chloride powder:

the improvement which results in an increase in the apparent density and an improvement in the flow characteristic of the product powder, which improvement comprises:

admixing iron powder, the iron powder having been produced by the hot hydrogen reduction of ferrous chloride briquettes, with the ferrous chloride powder to provide a mixture for the briquetting, reduction and comminution steps.

References Cited

UNITED STATES PATENTS

| | | | |
|---|---|---|---|
| 2,642,356 | 6/1953 | Beidler | 75—.5 |
| 2,642,357 | 6/1953 | Beidler | 75—.5 |
| 2,663,633 | 12/1953 | Crowley et al. | 75—.5 |

L. DEWAYNE RUTLEDGE, Primary Examiner

W. W. STALLARD, Assistant Examiner

U.S. Cl. X.R.

75—34